(12) United States Patent
Gaboury et al.

(10) Patent No.: US 7,457,692 B2
(45) Date of Patent: Nov. 25, 2008

(54) OCCUPANT CLASSIFICATION SENSOR CALIBRATION SYSTEM

(75) Inventors: Scott H. Gaboury, Ann Arbor, MI (US); Kirsten M. Carr, Ann Arbor, MI (US); Sarah D Smith, Novi, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 575 days.

(21) Appl. No.: 10/711,900

(22) Filed: Oct. 12, 2004

(65) Prior Publication Data

US 2006/0080011 A1 Apr. 13, 2006

(51) Int. Cl.
*G01M 17/00* (2006.01)
(52) U.S. Cl. .................... 701/34; 701/45; 180/271; 280/735
(58) Field of Classification Search .......... 701/29, 701/34, 45, 46–47; 280/734, 735; 180/268, 180/270, 271, 273
See application file for complete search history.

(56) References Cited

U.S. PATENT DOCUMENTS

| | | | |
|---|---|---|---|
| 6,609,054 B2 | 8/2003 | Wallace | |
| 6,636,792 B2 | 10/2003 | Lichtinger et al. | |
| 6,677,538 B2 | 1/2004 | Cook, Jr. et al. | |
| 2001/0025730 A1 | 10/2001 | Cook, Jr. et al. | |
| 2002/0043789 A1 | 4/2002 | Lichtinger et al. | |
| 2003/0040858 A1* | 2/2003 | Wallace | 701/45 |
| 2003/0220766 A1 | 11/2003 | Saunders et al. | |
| 2003/0222440 A1* | 12/2003 | Basir et al. | 280/735 |

* cited by examiner

*Primary Examiner*—Gertrude Arthur Jeanglaud
(74) *Attorney, Agent, or Firm*—Frank MacKenzie

(57) ABSTRACT

A method of calibrating an occupant classification sensor (16) includes receiving a calibration signal originating from an on-board vehicle calibration device (24). A calibration task is performed that includes the initialization of an occupant classification sensor (16). A baseline is generated for the occupant classification sensor (16) in response to the calibration signal. Performance confirmation of the calibration task is indicated.

20 Claims, 2 Drawing Sheets

OCCUPANT CLASSIFICATION SENSOR CALIBRATION SYSTEM

TECHNICAL FIELD

The present invention relates to vehicle sensing systems and more particularly, to a system and method of calibrating vehicle occupant classification sensors.

BACKGROUND OF THE INVENTION

Various sensing systems currently exist for performing collision warning and countermeasure system operations, such as detection, classification, tracking, and relative distance and velocity estimation of objects within a close proximity of a host vehicle. Sensing systems also exist for performing other sensing system operations, such as windshield wiper and defogger operations, occupant sensing, classification, and tracking operations, and adaptive cruise control operations.

Collision warning and countermeasure systems operations include providing a vehicle operator knowledge and awareness of vehicles and objects that are within close proximity of the host vehicle to prevent colliding with those objects. Countermeasure systems exist in various passive and active forms. Some countermeasure systems are used to aid in the prevention of a collision, and others are used to aid in the prevention of and injury to a vehicle occupant.

Certain collision warning and countermeasure systems are able to sense an object within a close proximity of the host vehicle and warn the host vehicle operator, such that the operator can take precautionary steps to prevent a collision or injury. Other collision warning and countermeasure systems activate passive or active countermeasures such as airbags, load limiting seatbelts, or brake control whereby the system itself aids in the prevention of a collision or an injury.

Occupant related operations include detecting occupant characteristics, determining which safety system countermeasures to perform, and adjusting times and rates of the countermeasures. Example restraint countermeasures that may be enabled are seat belt pretensioners and airbags. Occupant characteristics may include occupant positions within a seat, occupant size and weight, or other known occupant characteristics.

Currently occupant classification sensor (OCS) systems are being developed and deployed as part of a restraints system to satisfy federal smart airbag regulations, such as the regulations in FMVSS208. An OCS system often needs to be calibrated or zeroed after performance of a service procedure on the OCS system or associated vehicle. The calibration of an OCS system sets a baseline for future sensor data. In order to perform this calibration special electronic tools are required to initialize and zero the OCS system. Some service shops are unequipped with the required electronic tools due to the cost and availability of the tools. As such, only certain service shops can perform the stated calibration.

Thus, there exists a need for an improved calibration technique that does not require the use of specialized equipment and that is simple, inexpensive, and easy to implement.

SUMMARY OF THE INVENTION

The present invention provides a method of calibrating an occupant classification sensor. The method includes the reception of a calibration signal originating from an on-board vehicle calibration device. A calibration task is performed that includes the initialization of an occupant classification sensor. A baseline is generated for the occupant classification sensor in response to the calibration signal. Performance confirmation of the calibration task is indicated.

The embodiments of the present invention provide several advantages. One such advantage is the provision of an occupant classification sensor calibration technique that may be performed without the use of specialized electronic equipment.

Another advantage provided by an embodiment of the present invention is the provision of an occupant classification sensor calibration technique that may be performed by any individual with knowledge of a predetermined set of pre-calibration tasks and an associated sequence thereof to be performed to initiate the stated calibration.

In addition, the present invention provides a simple, cost-effective, and easy-to-implement method of calibrating occupant classification sensors of a vehicle The present invention itself, together with attendant advantages, is best understood by reference to the following detailed description, when taken in conjunction with the accompanying drawing figures.

BRIEF DESCRIPTION OF THE DRAWINGS

For a more complete understanding of the invention, reference should be made to embodiments illustrated in greater detail in the accompanying drawing figures, and also described below by way of examples of the invention, wherein.

DETAILED DESCRIPTION

While the present invention is described with respect to a system and method of calibrating an occupant classification sensor, the present invention may be adapted to be used in various applications and systems including: collision warning systems, collision avoidance systems, parking-aid systems, reversing-aid systems, passive countermeasure systems, adaptive cruise control systems, lane departure systems, lane-keeping systems, windshield clearing systems, or other systems known in the art. The present invention may be used to supplement a pre-collision sensing system.

In the following description, various operating parameters and components are described for multiple constructed embodiments. These specific parameters and components are included as examples and are not meant to be limiting.

Additionally, in the following description, the term "performing" may include activating, deploying, initiating, powering, and other terms known in the art that may describe the manner in which a countermeasure or a comfort and convenience feature may be operated.

As well, in the following description, various countermeasures are discussed. The countermeasures may be reversible or irreversible. Reversible countermeasures refer to countermeasures that may be reset to their original form or used repeatedly without a significant amount of functional deficiency, which may be determined by a system designer. Irreversible countermeasures refer to countermeasures such as airbags that, once deployed, are not reusable.

Furthermore, a countermeasure signal may include information pertaining to the above-stated reversible and irreversible countermeasures or may include other information, such as collision warning information, and parking-aid or reversing-aid countermeasure information. For example, the countermeasure signal may contain object detection information, which may be used to indicate to a vehicle operator the presence or close proximity of a detected object.

In addition, the term "object" may refer to any animate or inanimate object. An object may be a vehicle, a pedestrian, a lane marker, a road sign, a roadway lane designating line, a vehicle occupant, window moisture, or other object known in the art.

Figure 1:
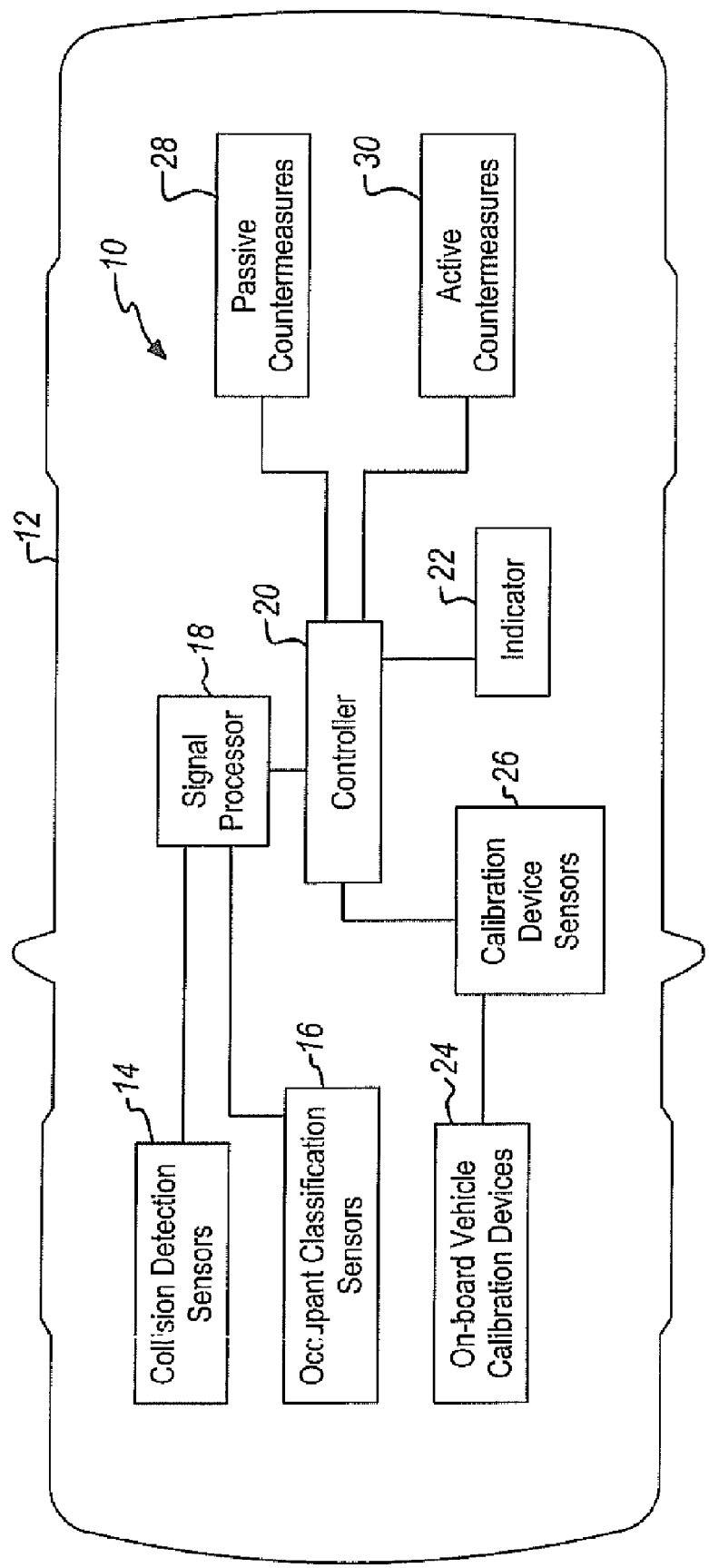
FIG. 1 is a block diagrammatic view of an occupant classification sensor calibration system for a vehicle in accordance with an embodiment of the present invention.

Referring now to FIG. 1, a block diagrammatic view of an occupant classification sensor calibration system 10 for a vehicle 12 in accordance with an embodiment of the present invention is shown. The calibration system 10 includes collision detection sensors 14 and occupant classification sensors 16. The collision detection sensors 14 monitor an environment exterior to the vehicle 12 and generate object detection signals upon detection of an object. The occupant classification sensors 16 monitor interior areas of the vehicle 12 and generate occupant classification signals in response to the presence and characteristics of occupants therein.

A signal processor 18 is coupled to the collision detection sensors 14 and the occupant classification sensors 16 and formats the object detections signals and the occupant classification signals. A controller 20 is coupled to the signal processor 18 and may be utilized to calibrate the occupant classification sensors 16. The controller 20 may also perform various sensing system and countermeasure operations in response to the object detection signals and occupant classification signals. An indicator 22 is coupled to the controller 20 and may be utilized in the calibration of the occupant classification sensors 16 and in the performance of various countermeasure operations.

Multiple on-board vehicle calibration devices 24 are coupled to the controller 20 and are utilized to initiate a calibration of the occupant classification sensors 16. The on-board calibration devices 24 may include a brake pedal, a gas pedal, a key cylinder, an ignition switch, a key receiver, a timer, a seat, seat belt buckle, a set belt retractor, a seat belt receiver, a seat belt buckle receiver, a seat belt anchor, a button, a switch, a latch, and a dial, as well as other on-board calibration devices known in the art. The on-board calibration devices 24 are devices that may be manually actuated, adjusted, or have pressure applied thereon without the use of specialized tools or electronic equipment. The on-board calibration devices 24 may be configured such that they are manually altered or changed without the use of any tools. For example, the depressing of a foot pedal or the applying pressure on a seat pan of a seat system do not require any tools; one can perform such actions by simply stepping on the pedal or by sitting on the seat system.

The multiple on-board calibration devices 24 include associated calibration device sensors 26. The calibration device sensors 26 are used to detect such change in the on-board calibration devices. For example, a calibration device sensor 26 may be used to detect actuation or translation of a foot pedal or the turning of a key cylinder and the amount of translation or rotation thereof. The calibration device sensors 26 may include the occupant classification sensors. The calibration device sensors 26 may be of various types and styles known in the art to detect actuation, translation, displacement, rotation, or other alteration of the on-board calibration devices 24.

The collision detection sensors 14 and the occupant classification sensors 16 may be infrared, vision, ultrasonic, radar, or lidar based or may be in the form of an accelerometer, a piezo electric sensor, a piezo resistive sensor, a charged-coupled device, a series of photodiodes, or in some other form known in the art. The collision detection sensors 14 and the occupant classification sensors 16 may also be in the form of a pressure sensor or a strain gage. The collision detection sensors 14 and the occupant classification sensors 16 may be in various locations on the vehicle.

The controller 20 may enable various passive countermeasures 28 and active countermeasures 30 in response to the object detection signals. The controller 20 as part of a countermeasure may generate a warning signal and communicate the warning signal to vehicle occupants via the indicator 22.

The signal processor 18 receives and converts the object detection signals and the occupant classification signals into a proper format for reception by the controller 20. The signal processor 18 may include analog-to-digital converters, filters, or amplifiers, as well as other signal conditioning components known in the art. The signal processor 18 may be part of the collision detection sensors 14, the occupant classification sensors 16, or the controller 20, may be a stand-alone device, as shown, or may be some combination thereof.

The controller 20 may be microprocessor based such as a computer having a central processing unit, memory (RAM and/or ROM), and associated input and output buses. The controller 20 may be an application-specific integrated circuit or be formed of other logic devices known in the art. The controller 20 may be a portion of a central vehicle main control unit, an interactive vehicle dynamics module, a restraints control module, a main safety controller, or may be a stand-alone controller as shown.

The controller 20 may perform various different sensing system operations including adaptive cruise control, lane-keeping control, lane-departure control, window clearing control, collision avoidance control, countermeasure control, or other sensing system operations known in the art. The operations may be performed sequentially or simultaneously.

The occupant characteristics may include occupant positioning within a seat, occupant size, shape, weight, or other known occupant characteristics.

The controller 20 determines which of the sensing system operations to perform. The controller 20 while performing one or more of the sensing system operations may determine whether to perform one or more of the countermeasures 28 and 30 and indicate to the vehicle operator various object and vehicle status information. Depending upon relative positions, velocities, and accelerations of the detected objects, the controller 20 may also determine whether to indicate to the vehicle operator of a potential collision or may perform a countermeasure, as needed, so as to prevent a collision, mitigate a potential injury, or prevent the vehicle 12 from traveling outside a current lane of travel.

The indicator 22 is used to signal or indicate a safety system signal, which may include a calibration signal, an occupant classification sensor related signal, a warning signal, a collision-warning signal, a countermeasure signal, or an object identification signal in response to the object detection signals. The indicator 22 may include a video system, an audio system, an LED, a light, a global positioning system, a heads-up display, a headlight, a taillight, a display system, a telematic system, or other indicator known in the art. The indicator 22 may supply warning signals, collision-related information, lane departure and lane-keeping information, external-warning signals to objects or pedestrians located outside of the vehicle 12, or other pre and post collision information.

The passive countermeasures 28 may include internal air bag control, seatbelt control, knee bolster control, head restraint control, load limiting pedal control, load limiting steering control, pretensioner control, external air bag control, pedestrian protection control, and other passive countermeasures known in the art.

The active countermeasures 30 may include brake control, throttle control, steering control, suspension control, transmission control, and other vehicle control systems. The controller 20 may signal the vehicle operator via the indicator 26 of an impending potential collision so that the vehicle operator may actively perform a precautionary action, such as applying the brakes or steering to prevent a collision.

Figure 2:
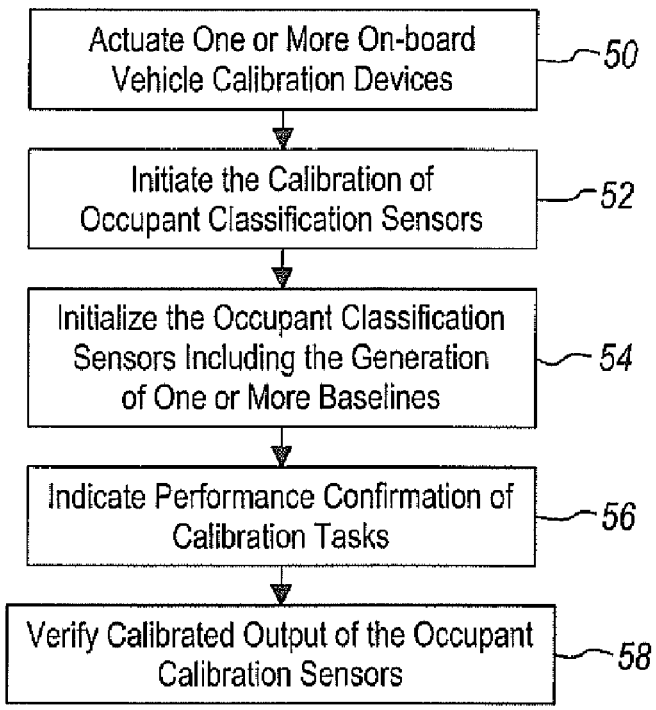
FIG. 2 is a logic flow diagram illustrating a method of calibrating an occupant classification sensor in accordance with an embodiment of the present invention.

Referring now to FIG. 2, a logic flow diagram illustrating a method of calibrating an occupant classification sensor in accordance with an embodiment of the present invention is shown.

In step 50, pressure is applied to one or more of the on-board calibration devices 24 or the on-board calibration devices 24 are actuated, adjusted, or altered as described above. Actuation of the on-board calibration devices 24 includes depressing, switching, pushing, pulling, stepping on, turning, flipping, dialing, or performing any other physical actuation task known in the art. In response to and indicative of such change in the calibration devices 24 the calibration device sensors 26 generate calibration initiation signals. Thus, the calibration signals originate from the change in the on-board calibration devices 24.

A series or sequence of pre-calibration tasks may be performed to generate the calibration signals. The pre-calibration tasks may have a pre-determined specific order in which they are to be performed in order to initiate the calibration of the occupant classification sensors 16. The pre-calibration tasks may include, for example, actuation of an ignition switch, application of pressure on a seat system for a predetermined time period, buckling and unbuckling of a seat belt, toggling of door locks, and releasing pressure on a seat system. The pre-calibration tasks may include any similar task that does not require the use of vehicle external special electronic tools or equipment to perform such task. Note that the above-provided examples do not require the use of any tools or equipment to perform. Each pre-calibration task may be performed any number of times or for any predetermined amount.

In step 52, the controller 20 generates a calibration confirmation signal in response to the calibration signals indicating that a calibration procedure has been initiated. The controller 20 may provide such indication via the indicator 22.

In step 54, the controller 20 performs one or more calibration tasks in response to the calibration signals. The calibration tasks may include the initializing and zeroing or generating of one or more baselines associated with the occupant classification sensors 16. The baselines may be in the form of occupant weight baselines, occupant position baselines, occupant present baselines, occupant size baselines, some other baselines known in the art, or a combination thereof.

For example, a calibration technician may upon performing the pre-calibration tasks and receiving the calibration confirmation signal may remove any objects including him or herself from a seat system, thus removing any pressure applied on the seat system. Upon removing the objects from the seat system, an applied force baseline may be acquired from an occupant classification sensor located within the seat system. The force baseline provides the controller 20 with a corresponding output of the occupant classification sensor, such as a pressure sensor located within a seat pan area of the seat system, which is assigned a value of zero. The output value is set to represent zero force applied to or zero weight present on the seat system. Force and weight values for objects thereafter set on the seat system are determined in response to the force baseline.

In step 56, performance confirmation of each calibration task may be indicated on the indicator 22 including the completion of the occupant classification sensor calibration. The indicator 22 may as an example flash a predetermined amount to indicate completion of the calibration process.

In step 58, calibrated output of the occupant classification sensors 16 may be verified by for example sitting in the seat system and generating an occupant classification signal and comparing that signal with a known weight of the occupant. Of course, other various verification techniques known in the art may be utilized. Step 58 may or may not be performed depending upon system requirements.

Figure 3:
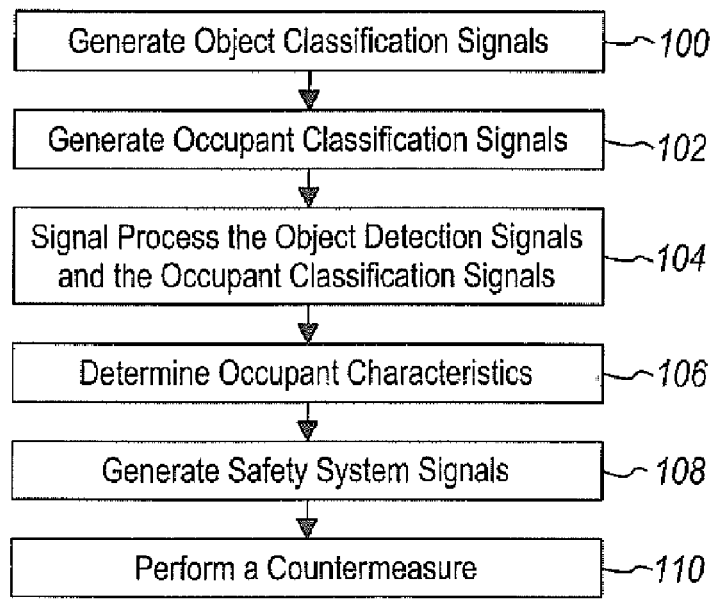
FIG. 3 is a logic flow diagram illustrating a method of operating a vehicle countermeasure system in accordance with an embodiment of the present invention.

Referring now to FIG. 3, a logic flow diagram illustrating a method of operating a vehicle countermeasure system in accordance with an embodiment of the present invention is shown.

In step 100, the collision detection sensors 14 generate multiple object detection signals corresponding to the detection of objects within areas external to the vehicle 12.

In step 102, the occupant classification sensors 16 generate occupant classification signals in response to the one or more baselines determined in the method of FIG. 2.

In step 104, the signal processor 18 converts, modifies, and formats the object detection signal and the occupant classification signals for reception by the controller 20. The signal processor 18 may, for example, include an analog-to-digital converter to convert analog image signals into a digital format.

In step 106, the controller 20 may determine occupant characteristics, such as size, weight, height, and seat position, in response to the object detection signals and the occupant classification signals. In determining occupant characteristics the controller 20 may also determine whether a child safety seat is located within a vehicle seat.

In step 108, the controller 20 generates multiple safety system signals in response to the object detection signals and the occupant classification signals. The safety system signals may include not only countermeasures related signals, as stated above, but may also include signals related to other sensing system controls.

In step 110, the controller 20 may perform multiple sensing system operations in response to the safety system signals. The controller 20 may perform a countermeasure operation, a windshield clearing operation, an adaptive cruise control operation, or any of the other above-mentioned or known in the art sensing system operation in response to the safety system signals. As an example, the occupant classification sensors 16 may detect an occupant that is small in size or a child safety seat within a seat system and decelerate or prevent activation of an air bag near the occupant or safety seat.

The above-described steps in the methods of FIGS. 2 and 3 are meant to be illustrative examples; the steps may be performed sequentially, synchronously, simultaneously, or in a different order depending upon the application.

The present invention provides a quick, simple, and inexpensive technique for calibrating occupant classification sensors with a vehicle. The technique may be performed without the use of specialized calibration tools and equipment.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of calibrating at least one occupant classification sensor onboard a vehicle, said method comprising the steps of:
    sensing physical manipulations of at least one onboard calibration device and determining whether said physical manipulations are in a predetermined order so as to initiate an onboard procedure for calibrating said at least one occupant classification sensor;
    upon initiation of said onboard procedure, sensing physical manipulations of said at least one onboard calibration device and accordingly generating calibration signals;
    performing at least one calibration task, including initializing and generating at least one baseline for at least one said occupant classification sensor, in response to said calibration signals; and
    affirmatively indicating performance of at least one said calibration task.

2. A method as in claim 1, wherein said physical manipulations are sensed by sensors, and said calibration signals are generated by said sensors.

3. A method as in claim 1, wherein at least one said calibration task is at least partially performed by at least one controller.

4. A method as in claim 1, wherein at least one said onboard calibration device is an ignition switch, and at least some of said calibration signals are generated in response to actuation of said ignition switch.

5. A method as in claim 1, wherein at least one said onboard calibration device is a pressure-sensitive seat system, and at least some of said calibration signals are generated in response to the application of pressure on said seat system for a predetermined time period.

6. A method as in claim 1, wherein at least one said onboard calibration device is a seat belt, and at least some of said calibration signals are generated in response to buckling and unbuckling said seat belt a predetermined number of times.

7. A method as in claim 1, wherein at least one said onboard calibration device is a pressure-sensitive seat system, and at least some of said calibration signals are generated in response to the release of pressure on said seat system.

8. A method as in claim 1, wherein generating said at least one baseline is at least partially accomplished by zeroing said at least one occupant classification sensor.

9. A method as in claim 1, wherein the step of affirmatively indicating performance of at least one said calibration task is at least partially accomplished by affirmatively indicating that said onboard procedure for calibrating said at least one occupant classification sensor has been initiated.

10. A method as in claim 1, wherein the step of affirmatively indicating performance of at least one said calibration task is at least partially accomplished by affirmatively flashing an indicator lamp a predetermined number of times.

11. A method as in claim 1, said method further comprising the steps of:
    generating occupant classification signals in response to said at least one baseline;
    generating a calibrated output in response to said calibration signals and said occupant classification signals; and
    verifying said calibrated output.

12. A method as in claim 1, wherein at least one said calibration task is performed in response to at least some of said calibration signals when received in a predetermined sequence.

13. An occupant classification system for a vehicle, said occupant classification system comprising:
    at least one occupant classification sensor having at least one associated baseline and operable to generate occupant classification signals;
    at least one manipulable onboard calibration device;
    at least one calibration device sensor operable to generate calibration signals according to physical manipulations of said at least one onboard calibration device;
    a controller coupled to each said occupant classification sensor and each said calibration device sensor and operable to receive said calibration signals, adjust each said baseline, and generate at least one calibrated output in response to said occupant classification signals and said calibration signals; and
    at least one indicator coupled to said controller and operable to affirmatively indicate performance of at least one system task associated with calibrating said at least one occupant classification sensor;
    wherein said controller is operable to determine whether said physical manipulations are in a predetermined order so as to initiate at least one said system task for calibrating at least one said occupant classification sensor.

14. An occupant classification system as in claim 13, wherein at least one said occupant classification sensor is selected from the group consisting of a pressure sensor, a strain gage, a piezo electric sensor, an infrared sensor, a piezo resistive sensor, and an ultrasonic sensor.

15. An occupant classification system as in claim 13, wherein at least one said baseline is selected from the group consisting of an occupant weight baseline, an occupant position baseline, an occupant present baseline, and an occupant size baseline.

16. An occupant classification system as in claim 13, wherein at least one said onboard calibration device is selected from the group consisting of a brake pedal, a gas pedal, a key cylinder, an ignition switch, a key receiver, a timer, a seat a seat belt buckle, a set belt retractor, a seat belt receiver, a seat belt buckle receiver, a seat belt anchor, a button, a switch, and a dial.

17. An occupant classification system as in claim 13, wherein at least one said indicator is selected from the group consisting of an LCD display, a monitor, an LED, a display, a dashboard vehicle system status indicator, an audio system, a video system, a heads-up display, and a lamp.

18. An occupant classification system as in claim 13, wherein said controller is operable to adjust at least one said baseline when said calibration signals are received in a predetermined sequence.

19. A countermeasure system for a vehicle, said countermeasure system comprising:
    at least one collision detection sensor operable to detect an object and accordingly generate object detection signals;
    at least one occupant classification sensor having at least one associated baseline and operable to generate occupant classification signals;
    at least one manipulable onboard calibration device;
    at least one calibration device sensor operable to generate calibration signals according to physical manipulations of said at least one onboard calibration device;
    a controller coupled to each said collision detection sensor, each said occupant classification sensor, and each said calibration device sensor and operable to receive said calibration signals, adjust each said baseline, and generate at least one calibrated output in response to said occupant classification signals and said calibration signals;

at least one indicator coupled to said controller and operable to affirmatively indicate performance of at least one system task associated with calibrating said at least one occupant classification sensor; and at least one countermeasure coupled to said controller;

wherein said controller is operable to determine whether said physical manipulations are in a predetermined order so as to initiate at least one said system task for calibrating at least one said occupant classification sensor, and said controller is operable to perform at least one said countermeasure in response to said object detection signals and at least one said calibrated output.

20. A countermeasure system as in claim 19, wherein at least one said countermeasure is a device selected from the group consisting of a pretensioner, an air bag, a knee bolster device, a head restraint device, and a load-limiting device.

* * * * *